HOTEL TELEVISION SYSTEM

Filed June 28, 1949 6 Sheets-Sheet 1

INVENTORS
WARREN J. OESTREICHER
SIDNEY LIDZ
SAVA JACOBSON
BY Theodore Hafner
ATTORNEY Oct. 9, 1951 W. J. OESTREICHER ET AL 2,570,475

HOTEL TELEVISION SYSTEM

Filed June 28, 1949 6 Sheets-Sheet 2

INVENTORS
WARREN J. OESTREICHER, SIDNEY LIDZ
SAVA JACOBSON
BY
Theodore Hafner
ATTORNEY Oct. 9, 1951 W. J. OESTREICHER ET AL 2,570,475

HOTEL TELEVISION SYSTEM

Filed June 28, 1949 6 Sheets-Sheet 3

INVENTORS
WARREN J. OESTREICHER, SIDNEY LIDZ,
SAVA JACOBSON
BY Theodore Hafner
ATTORNEY INVENTORS
WARREN J. OESTREICHER, SIDNEY LIDZ,
SAVA JACOBSON
BY Theodore Hafner
ATTORNEY Oct. 9, 1951 W. J. OESTREICHER ET AL 2,570,475

HOTEL TELEVISION SYSTEM

Filed June 28, 1949 6 Sheets-Sheet 5

INVENTOR
WARREN J. OESTREICHER, SIDNEY LIDZ,
SAVA JACOBSON
BY Theodore Hafner
ATTORNEY INVENTOR
WARREN J. OESTREICHER, SIDNEY LIDZ,
SAVA JACOBSON
BY [signature]
ATTORNEY Patented Oct. 9, 1951

2,570,475

UNITED STATES PATENT OFFICE 2,570,475

HOTEL TELEVISION SYSTEM

Warren J. Oestreicher, Brooklyn, Sidney Lidz, New York, and Sava Jacobson, Brooklyn, N. Y.

Application June 28, 1949, Serial No. 101,762

8 Claims. (Cl. 178—5.8)

This invention relates to television installations for hotels, apartments and similar multi-dwelling structures.

One of the objects of the invention is a system which permits the installation of a certain number of subscribers with a possibility of adding any appropriate number of further subscribers without substantial change in the system.

Another object of the invention is a system permitting the subscriber to select one of a predetermined number of stations and to provide a selection as wide as possible without substantially increasing the cost of installation.

A further object of the invention is to obtain an optimum of quality for each program without unduly complicating and increasing cable connections and cost of equipment.

Still another object of the invention is a central receiver unit which is compact in structure and yet supple enough to provide any number of additional installations without expensive changes in equipment.

A specific object of the invention is a subreceiver or subscriber receiver which is rugged in construction so that it may be used by many and different people without losing its high quality reproduction characteristics and the possibility of facile replacement and repair even by inexperienced labor.

Another specific object of the invention is distributing and connecting means permitting the wiring of any number of subscriber units rapidly and without requiring greater skill as would usually be necessary in setting up electrical distributing systems of any other type.

These and other objects of the invention are illustrated more fully in the accompanying drawings, a description of which follows.

Figure 1:
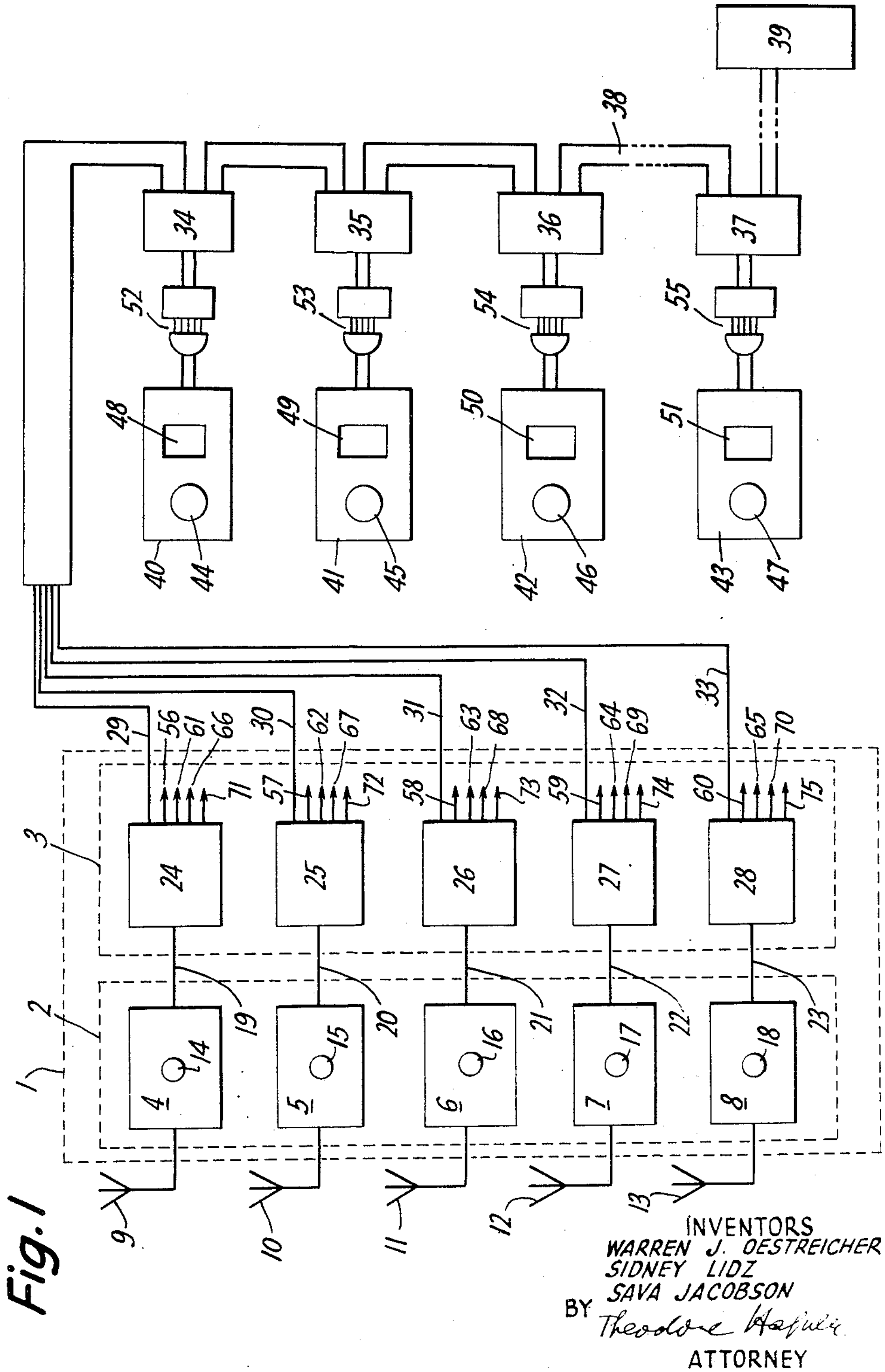
Figure 1 shows diagrammatically a master receiver station connected over distribution and connection equipment to a number of subscriber stations.

In Figure 1, 1 represents a master receiver station usually installed on the top floor of the apartment or hotel structure to be served. Station 1 is shown to comprise two racks 2 and 3; rack 2 supports a number of master receiver units 4, 5, 6, 7 and 8 each having an input circuit connected to an antenna system 9, 10, 11, 12 and 13 respectively, and each adapted to receive the radio frequency wave of one television channel. Each of the units 4 through 8 contains the customary radio frequency amplification, intermediate frequency amplification, detector and video amplification stages which are not shown in detail because they are believed to be within the ordinary skill of any one familiar with the art of television.

Each of the master receivers 4 through 8 is also connected in a manner to be explained further below but generally well known in the art to control associated monitoring loudspeakers not shown and monitoring cathode ray tubes shown at 14, 15, 16, 17 and 18, respectively, and so as to permit the station attendants to check and control the quality of picture and sound obtained through the channels served by the master receivers.

The channels and consequently the associated antennas and master receivers may be selected to any desired number and of any desired construction without exceeding the scope of this invention.

On their output sides, master receivers 4 through 8 are connected over lines 19, 20, 21, 22 and 23 to auxiliary amplifiers 24, 25, 26, 27 and 28, respectively, arranged on rack 3 of the master station.

Each master receiver for example, may have on its output side a level of say three volts with an impedance of say 100 ohms. After having been applied over coaxial cables 19 through 23 to amplifiers 24 through 28 the video energy may be required to reach a voltage level of say 40 volts, with the output impedance remaining as before at say 100 ohms.

The amplified video output thus obtained in each of amplifiers 24 through 28 is applied preferably over a number of parallel distributors or separator stages to coaxial lines 29, 30, 31, 32 and 33 respectively, and over a number of sub-distributors or junction or T-boxes connected in series and of a relatively great number, say 20, shown at 34, 35, 36 and 37 respectively, to the subscriber stations or slave receivers.

As shown in Figure 1, boxes 34 through 37 are connected in series with each other over coaxial transmission lines 29 through 33 and the coaxial line emerging from the last of the boxes shown at 37 is fed over line 38 into a line termination box 39 or resistance network of say 100 ohms, a device well known per se in the art of transmission line connection and, therefore, not described in more detail.

Each of boxes 34 through 37 serves a subscriber or slave receiver shown at 40, 41, 42, 43, respectively, and provided with cathode ray screens at 44, 45, 46, 47 and tuners at 48, 49, 50, 51, respectively. Slave receivers 40 through 43 are connected to junction boxes 34 through 37 respectively, through multi-contact connectors 52, 53, 54, 55, respectively.

In this way it is possible to associate with each set of master receivers, 4 through 8, or with each set of their auxiliary amplifiers, 24 through 28, a great number of subscriber stations arranged in a predetermined order or position in the building.

In the example shown, the subscriber stations associated with each of the five parallel groups of five cables derived from the auxiliary amplifiers, some of which are shown at 39 through 33, are arranged in vertical array in the hotel or apartment building so as to reduce wiring to a minimum without incurring interference.

Instead of the five lines emerging from each of the amplifiers 24 through 28, less or more lines may be derived depending, of course, on the capacity of the amplifier or of the distributors or separators associated therewith, without exceeding the scope of the invention.

In Figure 1, the outputs of auxiliary amplifiers 24 through 28 are shown to be derived as parallel groups of cables such as 56 through 60, 61 through 65, 66 through 70, 71 through 75, respectively, subdivided into another number of sets of cables, each set representing the five channels chosen for selective transmission, one set being diagrammatically shown at 29 through 33.

It is, however, possible without exceeding the scope of this invention, instead of associating say 10 parallel distribution elements with each channel or with auxiliary amplifier and to regroup them afterwards in five channel sets, to take the two channel cables out of the auxiliary amplifier and pass them through a number of distributor units each including five elements, the five elements of these channel units being connected in parallel with nine other units to make up the same number of distribution elements as before.

The manner in which parallel derivation and regrouping into sets of five cables may be made will be further explained in connection with Figure 2.

The means for parallel-division or separation of the outputs of amplifiers 24 through 28 may be incorporated, as shown in Figure 1 into the amplifiers 24 through 28 themselves, such division or separation means however may also be set up as separate dividing or separating stages as will be explained later on. The circuit diagram of Figure 2 permits any type or arrangement without exceeding the scope of the invention.

As shown in Figure 1 each of the cable bundles 56 through 60, 61 through 65, 66 through 70 and 71 through 75, respectively, are grouped into channel sets of five and each set is used to feed a number say 20, of vertically arranged subscribers, some of which are shown at 34 through 55.

Alternatively, it is possible without exceeding the scope of this invention, to have only cables 24 through 28 emerging from master receivers 4 through 8 or auxiliary amplifiers 24 through 28 and to feed these five cables only into a number of parallel division or separation stages.

Any other way affording appropriate distribution, division, grouping or regrouping of the amplifier outputs over a number of subscribers or subscriber groups may be employed without exceeding the scope of the invention.

Figure 2:
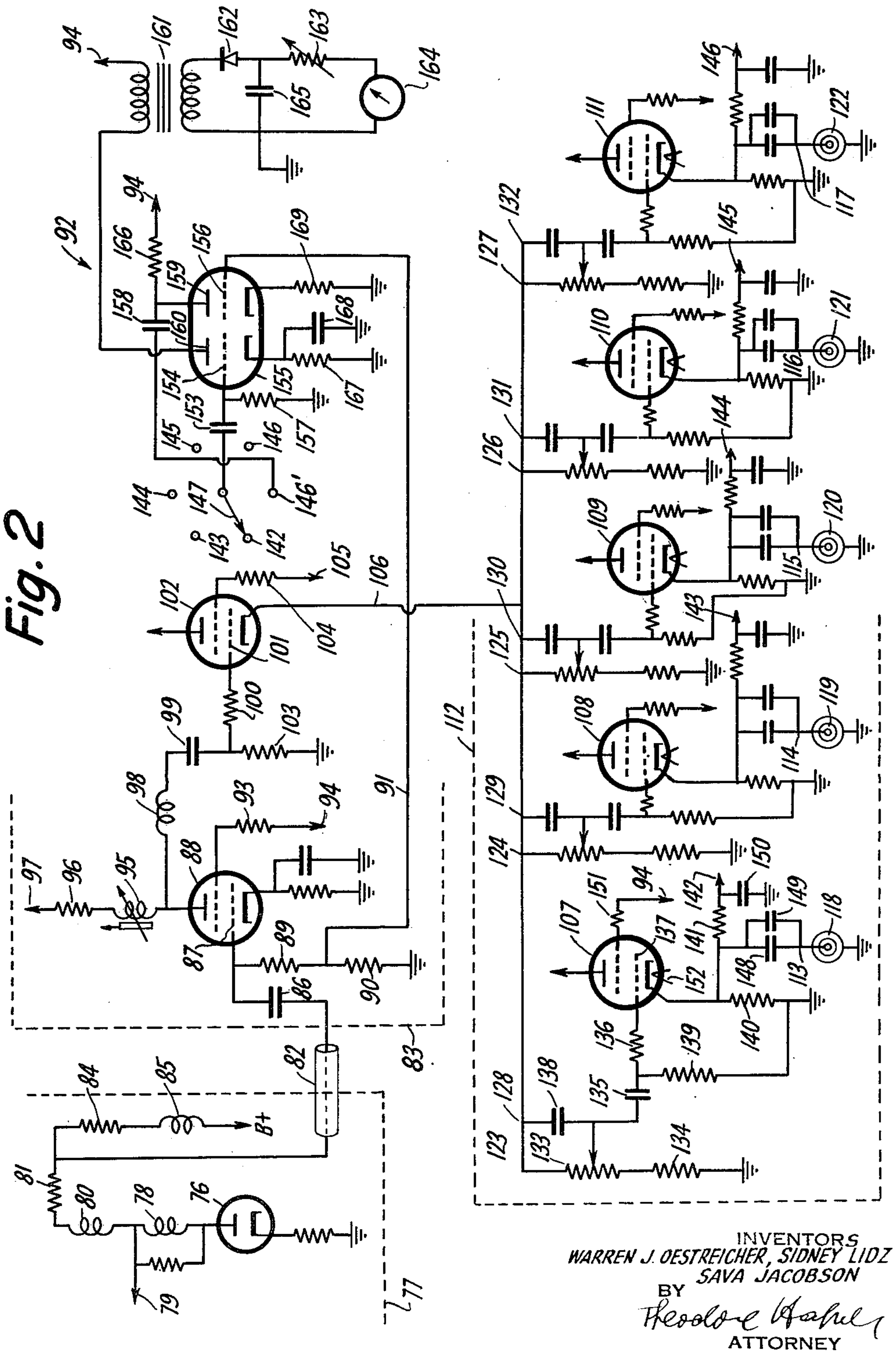
Figure 2 shows certain parts of the master receiver and their connections to a number of parallel distributors or separators including a level comparing circuit connected between master receiver and distributors.

Figure 2 shows one way to provide proper distribution in accordance with the principles set forth. Only one of the master receivers is shown and more specifically the last stage 76 of video amplifier 77. This last stage is a tube of the 6K6 type, the output circuit 78 of which is connected through line 79 to a master monitoring kinescope of say 10 inch type which, however, is not shown, such connection being well known in the art.

Output circuit 78 is also connected over coil 80, resistance 81 and coaxial cable 82 to auxiliary amplifier 83; resistor 84 of about 600 ohms and inductance 85 of 10 microhenries connecting the anode of stage 76 to B+ are used as peaking means.

The inner line of cable 82 is connected over a condenser 96 to control grid 87 of a tube 88 of the 6Y6G type. Grid 87 is connected over resistances 89 and 90 to ground. Part of the grid input is supplied over line 91 to a control or level measuring circuit shown in Figure 2 at 92. In the embodiment shown, the circuit serves to compare the height of the horizontal line level above the D. C. level of the system as will be explained later on.

The screen grid of tube 88 is connected over resistance 93 to point 94 of the power supply system diagrammatically shown in Figure 3 and described further below. The output circuit of tube 88 is connected over inductance 95 and resistance 96 to point 97 of the power supply system of Figure 3. The input side of inductance 95 is connected over another inductance 98, condenser 99 and resistance 100 to the input grid 101 of a tube 102 of the cathode follower type which may be also of the 6Y6G type having an anode connected to point 94 of the power supply system of Figure 3.

The control grid of tube 102 is connected over resistor 103 to ground. The screen grid of tube 102 is connected over resistor 104 to point 105 of the power supply system of Figure 3. The cathode output of tube 102 is connected over line 106 in parallel to the input circuits of a number of separating stages which are likewise of the cathode follower type and preferably also of the 6Y6G type. These tubes are shown at 107, 108, 109, 110 and 111, respectively.

Any number of such separation stages may be provided in accordance with the capacity of the amplifiers, the number of subscriber or subscriber groups, or dependent on any other factors without exceeding the scope of the invention.

As already stated above, the distribution or separation stages such as shown at 107 through 111 instead of as shown being assembled to be representative of or associated with a particular channel, a particular master receiver or a particular auxiliary amplifier, such separation stages may be bundled to be representative of or associated with different television channels, different master receivers or different auxiliary amplifiers.

Alternatively, any type of assembly or association of lines or separation stages may be provided in accordance with the spacial requirements of the distribution system or depending on any other requirements, without exceeding the scope of the invention.

Separator stages 107 through 111 may be arranged as already stated before in the same housing with auxiliary amplifier 83 or in a separate housing such as shown at 112, and in the same room or in different rooms, and on the same floor or on different floors without exceeding the scope of the invention.

Housing 112 is shown to comprise five terminals 113 to 117 connecting the cathodes of tubes 107 through 112 to the inner conductors of transmission lines 118 through 122 respectively.

In case the five separator stages 107 through 111 are not as shown connected in parallel to one auxiliary amplifier or channel but each of the stages 107 through 111 to different amplifiers or channels, then points 123 through 127 and 128 through 132 will each have to be provided with coaxial line terminals to permit continuous wiring in parallel to other five-stage sets of separators.

Cable 106 would be connected to the control grid of one of the stages 107 through 111, for example, at point 128 to the control grid of stage 107.

The remaining stages 108 through 111 would be connected in the following manner:

Point 128 would be connected to the grid of stage 108 at point 124. Control grid of stage 108 would be connected to control grid of stage 119 at point 125. Control grid of stage 119 would be connected to control grid of stage 110 at point 126 and control grid of stage 110 would be connected to control grid of stage 111 at point 127.

Thus, in the particular mode of distribution shown in Figures 1 and 2, line 106 would be connected effectively in parallel to all the control grids of the associated separation stages and distortionless separation over a number of distribution cables 118 through 122 would be effected in an extremely simple manner with a minimum of circuit connections and mutual interference.

Each separation stage has an input circuit independently controllable and consisting, as shown in the example of stage 107, of potentiometer 133, the end terminal of which is connected over a resistance 134 to ground and the center tap of which is connected over condenser 135 and resistor 136 to the control grid 137 of stage 107. The start winding of potentiometer 133 is shunted by capacity 138.

The junction point of condenser 135 and resistor 136 is connected over resistor 139 to ground. The cathode of each separator stage is also connected as shown in stage 107, over resistor 140 to ground and over resistor 141 to point 142 of control circuit 92. The corresponding points 143 through 146 in stages 108 through 111 are connected to corresponding points 143 through 146 in circuit 92. These points form the terminals of a switch 147 the function of which will be explained further below.

The cathode of each separator stage is further connected over two condensers 148, 149 connected in parallel to the inner conductor of transmission lines 118 through 122. Points 142 through 146 are also connected over condenser 150 to ground. The outer conductors of transmission lines 118 through 122 are grounded.

Figure 3:
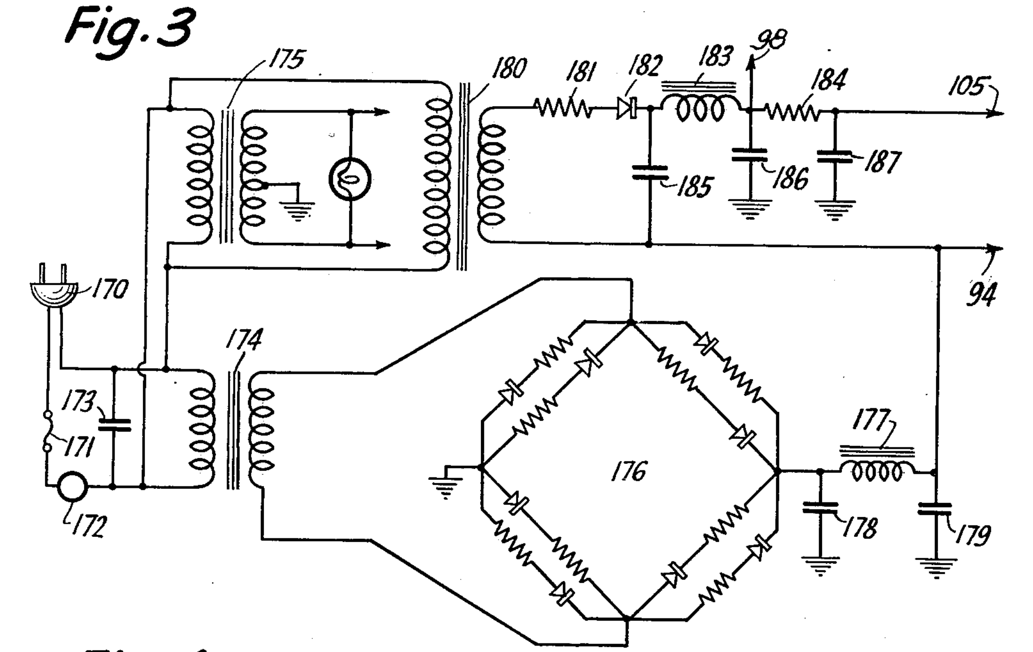
Figure 3 shows a power supply system for the distributors and the comparing circuit.
Figure 4:
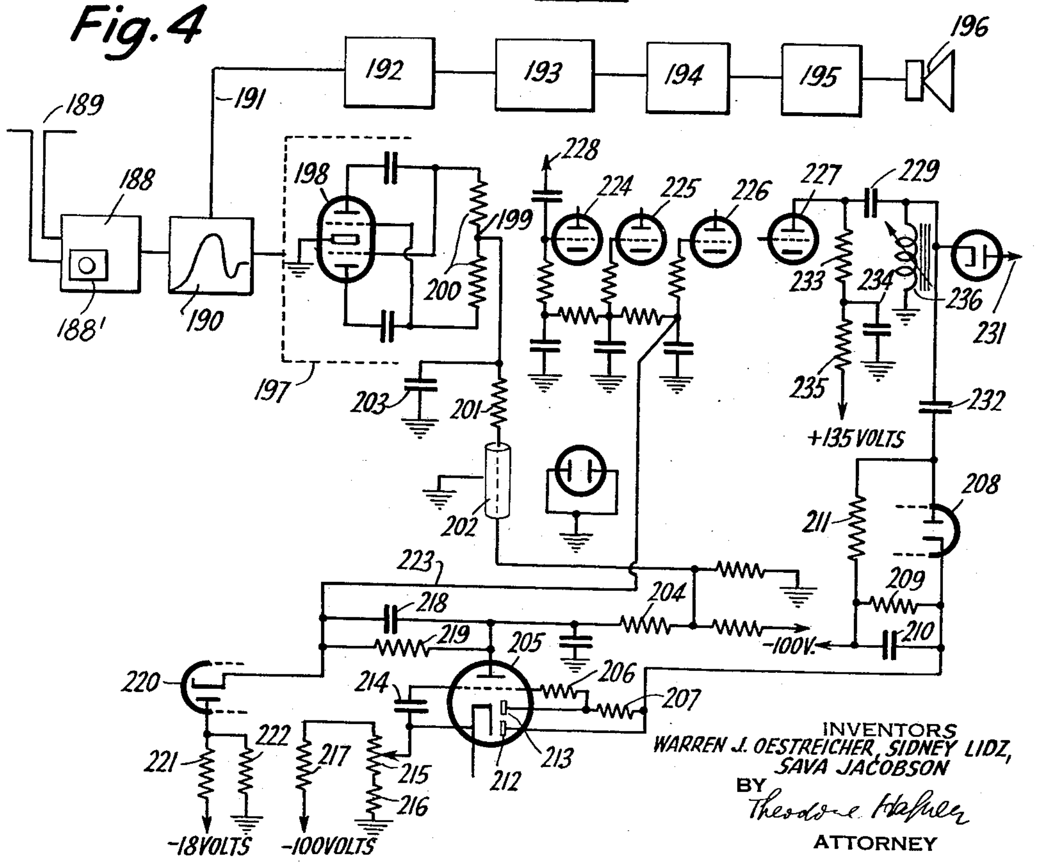
Figure 4 shows an automatic gain control system for the master receiver.

The screen grid of each separation stage, is connected, as shown for example in stage 107, over resistance 151 to point 105 of the power supply circuit shown in Figure 4. The anode of each stage is connected, as shown for example in stage 107, to point 94 of the power supply circuit of Figure 3. The heater filament of each element is shown to be connected, as for example in stage 107, to point 152 of power supply circuit of Figure 3.

Circuit 92, as already stated above, represents diagrammatically a comparison circuit to evaluate the height of the horizontal line above the D. C. level of each vertical distributing system or "riser." Each of the risers is connected for measurement by switching arm 147 to one of the terminal positions 142 through 146. This will connect one of these terminals over capacity 153 to grid 154 of twin triode 155; the second grid 156 of twin triode 155 is connected as already stated above, over line 91 to the junction point of resistances 89 and 90. Grid 154 is also connected over resistance 157 to ground. Point 146' of switch 147 is connected over condenser 158 to the anode 159 associated with grid 156 while anode 160 associated with grid 154 is connected to the primary of a transformer 161 the secondary of which feeds over rectifier 162, potentiometer 163 to a measuring instrument 164 shunted by condenser 165. Anode 159 is connected over resistance 166 to point 94 of the power supply circuit of Figure 3. Similarly, the remaining terminal of the primary of transformer 161 is also connected to point 94. The cathode associated with grid 154 is connected over a capacity resistance combination 167, 168 to ground while the cathode associated with grid 156 is grounded over resistance 169.

The power supply circuit of Figure 3 comprises input plug 170 for connecting the circuit to a 110 volt-60 cycle alternating current line. 171 represents a 5 ampere fuse, 172 a signal lamp; 173 is a smoothing condenser of .25 micromicrofarad for 600 volts. There are two transformers or transformer sections 174, 175, respectively; one supplies high voltage over a twin rectifier bridge circuit 176, the output of which is connected over a filter choke 177 to point 94. The terminals of choke 177 are also connected over condensers 178, 179 of 600 and 400 microfarads respectively, to ground.

The low voltage transformer or transformer section 175 is connected at its primary over a second transformer or transformer section 180, resistor 181, rectifier 182, choke 183 and resistor 184 to terminal 185. The secondary of transformer 180 is shunted by a 50 microfarad condenser 185 while the terminals of resistor 184 are connected over 40 microfarad condensers 186, 187, respectively, to ground. The junction point of choke 183 and resistor 184 is connected to point 98 of the separator system of Figure 2.

Figure 4 shows an automatic gain control system for the purpose of the invention. There again one of the master receivers is shown at 188. 189 represents an antenna, 188' a tuner, 190 a filter having a characteristic such as shown inside of box 190. Filter 190 serves to reduce sound rejection. In this way it is possible to tap, as it is shown at 191, a portion of the sound coming from tuner 188' and to pass it over intermediate frequency sound amplifier 192, limiter 193, discriminator 194, audio amplifier 195 to loudspeaker 196. Another portion of the sound energy passing tuner 188' is applied to video amplifier 197, a stage of which is shown at 198. 198 represents a radio frequency stage preferably the last one, in the radio frequency amplifier of the master receiver; 198 for example may be a 6J6 twin type tube. Its output terminals are interconnected at point 199 over resistances 200 and connected over resistance 201 to the inner conductor of a transmission line 202 the outer conductor of which is grounded. Point 199 is also grounded over a 1500 micromicrofarad condenser 203.

The inner conductor of transmission line 201 is connected over a resistance 204 of 27 kiloohms to the anode of an automatic gain control amplifier 205 which also acts as a noise clipper. The input electrode of stage 205 is controlled over a resistor 206 of 460 kiloohms and a resistor 207 of 100 kiloohms from the output circuit of a diode rectifier 208 the cathode of which is connected over a resistance 209 of 82 kiloohms shunted by capacity 210 of .001 microfarad and a series resistor 211 of 10 kiloohms to the anode and input circuit of rectifier diode 208. The junction point of parts 209, 210 is connected to —100 volt.

Stage 205 in order to act as a noise clipper is of the 6AT6 type and provided with two anodes shown at 212, 213 respectively, which are shunted by resistor 207. Thus only the synchronizing signals are permitted to pass while noise signals will be clipped off. The cathode of stage 205 is connected over a condenser 214 of .25 microfarad to the control grid and also to the variable tap of a potentiometer 215 of 1 kiloohm. One of the fixed terminals of potentiometer 215 is connected over resistor 216 of 22 kiloohms to ground; the other fixed terminal of potentiometer 215 is connected over another resistor 217 of 330 kiloohms to —100 volt.

As already stated above the output anodes of the combined gain control and noise clipper stage 205 is connected over transmission line 202 to the output circuit of radio frequency stage 198. However, the same output anode is also connected over a resistance-capacity combination 218, 219 of 220 kiloohms and .25 microfarad, respectively, to a diode 220 of the 6AL5 type connected to operate as a gain control limiter.

In order to achieve this purpose the junction point of parts 218, 219 is connected to the cathode of diode 220 while the anode thereof is connected over a 270 kiloohm resistor 221 to —18 volt and over a 47 kiloohm resistor 222 to ground. Thus, it is assured that only synchronizing pulses of predetermined level are passed through the automatic gain amplifier 205. The control pulses of stage 205 are passed from output circuit 218, 219 over line 223 to the input circuit of the amplifier stages which are to be controlled automatically.

In the particular case automatic gain control is applied to the biasing circuits of the intermediate frequency amplifier stages shown schematically at 224, 225, 226, 227. The first intermediate frequency amplifier stage 224 has an input grid connected at 228 to the converter (not shown), and the last intermediate frequency stage 227 has an output circuit connected over a 270 microfarad capacity 229 and a second detector 230 and point 231 to the video output amplifier (not shown). Condenser 229 is also connected over another condenser 232 of 33 microfarads to the input circuit of automatic gain control rectifier 208 which may be of the 6AL5 type.

Potentiometer 215 is connected to operate as contrast control.

The anode of stage 227 is also connected over a 5,600 ohm resistor 233 and a 1500 microfarad condenser 234 to ground and also over a 1 kiloohm resistor 234 to +135 volt. The cathode of detector 230 is connected over an adjustable choke 236 to ground.

In this way with a minimum of circuit elements an extremely efficient gain control will be obtained even at the occurrence of relatively large changes due to widely varying load conditions prevailing in hotel or apartment television distribution systems.

Figure 5:
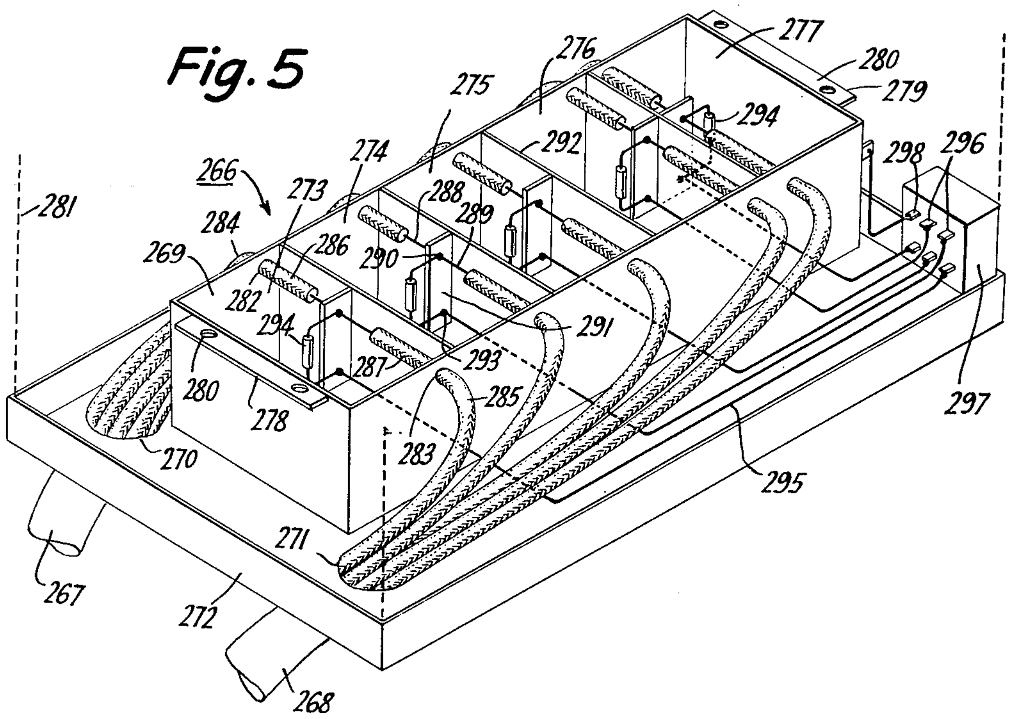
Figure 5 shows a sub-distributor or a junction box connecting the subscriber station to the distribution system.

Figure 5 shows the mechanical lay-out of a junction box embodying certain features of the invention.

Figure 6:
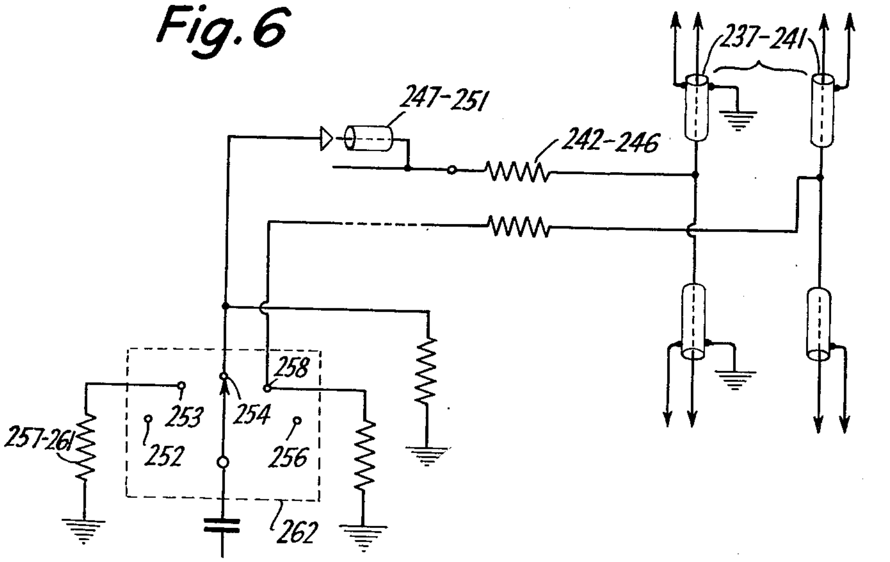
Figure 6 shows a corresponding circuit diagram.
Figure 7:
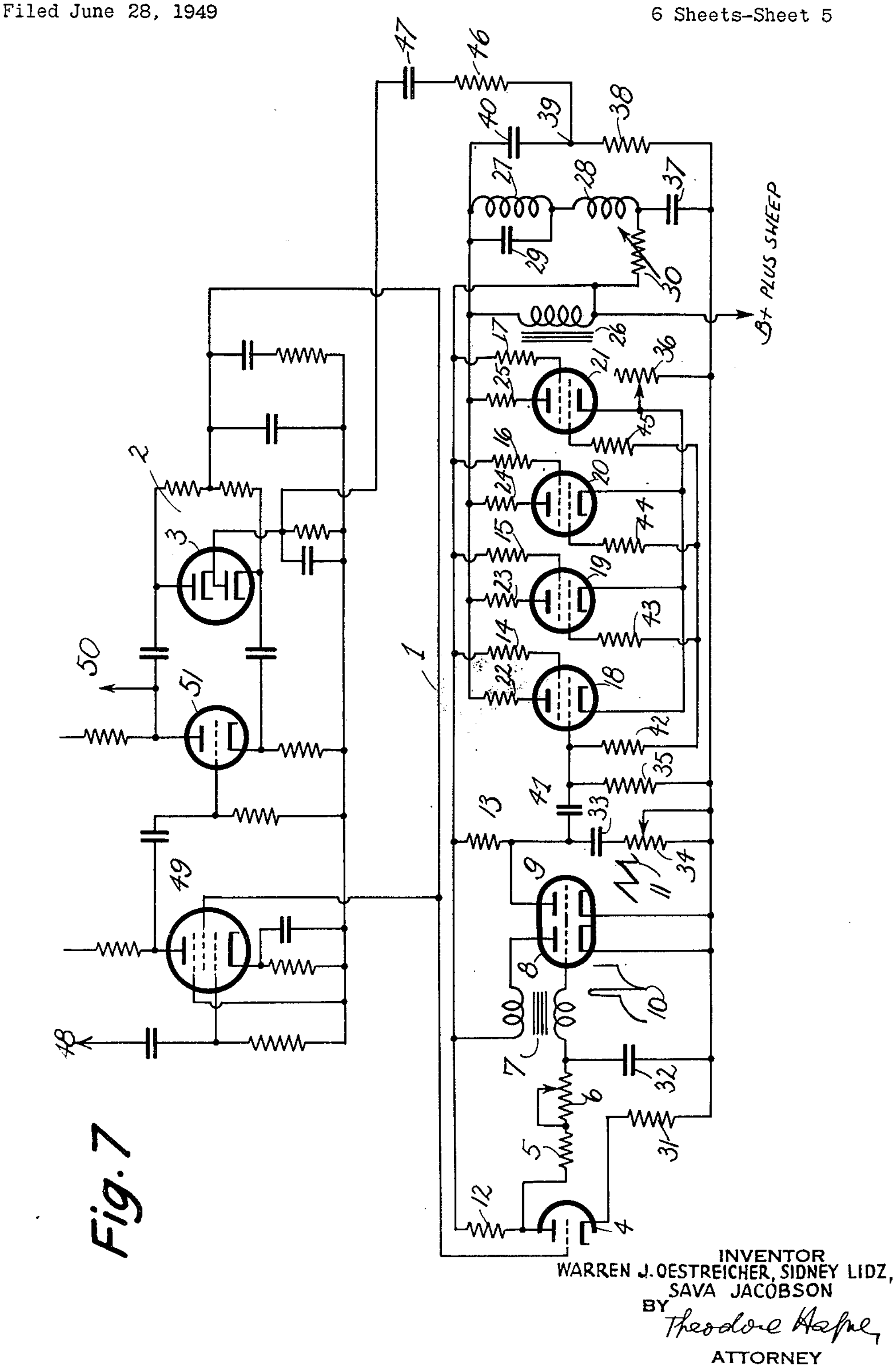
Figure 7 represents diagrammatically a subreceiver or slave receiver according to the invention.
Figure 8:
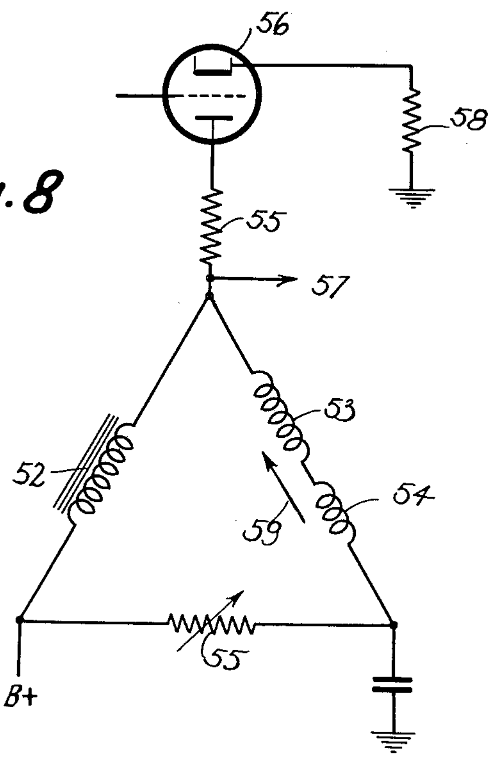
Figure 8 is a circuit diagram illustrating an important principle of the invention embodied in the slave receiver of Figure 7.

Figure 6 shows a corresponding circuit diagram.

In Figure 6 the five incoming coaxial cables schematically indicated at 237 through 241 are connected with their inner conductors, over resistors 242 to 246 of 1800 ohms each to the inner conductors of another set of coaxial cables schematically shown at 247 to 251 respectively. The outer conductors of cables 237 through 241 are grounded. The inner conductors of cables 247 through 251 lead to terminals 252 through 256 of a multi-contact socket. Terminals 252 through 256 are also grounded over a set of resistors 257 through 261 of 100 ohms each. A terminal plug indicated schematically in dotted lines at 262 fits into a corresponding socket of the slave receiver (not shown) to permit connection of the different coaxial cables with the different transmission channel circuits of the slave receiver.

The coaxial cables 234 through 239, as shown at points 261 through 265, are continued to the next junction box.

The cables are all low-loss cables each capable of carrying a frequency range of about 4.5 megacycles.

The invention is not limited to the impedance relations shown although these relations are preferred examples of the invention.

The cables are armored but it is also possible to use a polyethylene tubing provided with aluminum plating. This will increase flexibility of the cables and facilitate distribution of a greater number of channels.

Printed circuits may also be used especially in the separator and junction units, without exceeding the scope of the invention.

The five cables representing a five-channel transmission line to the slave receivers are intertwined so as to reduce distortion to a minimum and also to permit utmost flexibility and easy access to all types of localities and any number of subscribers.

In Figure 5, 266 represents the junction box diagrammatically indicated in Figure 6. Two five-line cables 267, 268 represent the continuing transmission line entering and leaving box 269 through holes 270, 271 in the front panel 272 of box 269. Front panel 272 also carries, underneath thereof, a five-compartment structure 273 through 277 which at its ends has flanges 278, 279 provided with holes 280 for connecting front panel 272 which preferably is of metal to the cover portion 281 which may also be of metal or of metallized plastic. Each of the compartments 273 through 277 has two opposite openings 282, 283 permitting entrance of cables 264, 265, in such a way that the armored or outer portion is soldered around the entrance of openings 282, 283 while the inner insulation or core portion of cables 264, 265 shown at 286, 287 enters compartments 273 through 277. The conductors 288, 289 are soldered to opposite sides of terminals 290 attached to terminal plates 291 which in turn are insulatingly attached to the separation walls 292 of compartments 273 through 277. The five upper and lower terminals 290 and 293 are interconnected through resistances 294 of 1800 ohms each and the lower terminals are connected over barium sulfate, and 64.83 per cent water. The results were as indicated in the following table:

*Table 2*

| Additive, lb./bbl. | Stormer Viscosity, 600 R. P. M., cps. | Gel Strength (g.) | | 30 min. Water Loss, ml. | Mud, pH |
|---|---|---|---|---|---|
| | | Initial | 10 min. | | |
| 0 | 16.5 | 20 | 20 | 56 | 7.9 |
| 1 | 5 | 5 | 7 | 53.5 | 8.0 |
| 2 | 4.5 | 0 | 0 | 35 | 8.0 |
| 4 | 8 | 0 | 0 | 13 | 8.0 |
| 6 | 8.5 | 0 | 0 | 6.5 | 8.1 |

EXAMPLE III

To test the resistance of my drilling muds to sodium chloride contamination, tests were run using a base mud to which had been added at least 50,000 parts per million of sodium chloride. The base mud comprised 0.8 per cent bentonite, 18.0 per cent kaolin, 8.0 per cent Ezmix, 0.17 per cent calcium sulfate, 26.20 per cent barium sulfate, and 64.83 per cent water, the sodium chloride being added to the water phase. The results of this test were as shown in the following table.

*Table 3*

| Additive, lb./bbl. | Stormer Viscosity, 600 R. P. M., cps. | Gel Strength (g.) | | API Water Loss, ml. | Mud, pH |
|---|---|---|---|---|---|
| | | Initial | 10 min. | | |
| [1] 0 | 11 | 15 | 15 | 64 | 7.9 |
| 0 | 12 | 15 | 17 | 64 | 7.9 |
| 1 | 5 | 3 | 5 | 65 | 7.9 |
| 2 | 9 | 0 | 30 | 52 | 7.9 |
| 4 | 5 | 0 | 0 | 25 | 7.9 |
| 6 | 7 | 0 | 0 | 6.8 | 8.0 |

[1] This was a sample of base mud before the addition of sodium chloride.

The above simple experiments are merely representative and are given to show how water soluble ethyl sulfoethyl cellulose may be used in water base drilling muds by those skilled in the art and are not to be considered as unduly limiting my invention.

It is to be understood that while a theory of operation has been advanced, it is not the only or necessary one, but has only been advanced to facilitate the disclosure and this invention is not limited to any theory of operation or action. It is to be understood that the invention is not to be limited to the specific details described. For example, the tests with treating and control agents indicate that water soluble ethyl sulfoethyl celluloses are somewhat inert chemically and that all the treating and control agents of the well drilling fluid and well controlling fluid arts may, after a simple test for solubility and lack of obvious adverse reaction, be employed without invention in my water soluble ethyl sulfoethyl cellulose drilling and controlling fluids. My invention is, therefore, defined by the following claims.

Having described my invention, I claim:

1. A water base well drilling mud comprising, in combination, sufficient water to maintain the mud as a fluid, sufficient clayey material to form a filter cake on the wall of the well, and a water soluble ethyl sulfoethyl cellulose selected from the group consisting of ethyl sulfoethyl cellulose and the water soluble salts thereof in an amount sufficient to reduce the water loss due to filtration through said filter cake without increasing the viscosity of said well drilling mud to such an extent that it cannot be circulated.

2. A water base well drilling mud comprising, in combination, sufficient water to maintain the mud as a fluid, sufficient clayey material to form a filter cake on the wall of the well, and a water soluble ethyl sodium sulfoethyl cellulose in an amount sufficient to reduce the water loss due to filtration through said filter cake without increasing the viscosity of said well drilling mud to such an extent that it cannot be circulated.

3. A water base well drilling mud comprising, in combination, sufficient water to maintain the mud as a fluid, sufficient clayey material to form a filter cake on the wall of the well, and a water soluble ethyl ammonium sulfoethyl cellulose in an amount sufficient to reduce the water loss due to filtration through said filter cake without increasing the viscosity of said well drilling mud to such an extent that it cannot be circulated.

4. A water base well drilling mud comprising, in combination, sufficient water to maintain the mud as a fluid, sufficient clayey material to form a filter cake on the wall of the well, and a water soluble ethyl magnesium sulfoethyl cellulose in an amount sufficient to reduce the water loss due to filtration through said filter cake without increasing the viscosity of said well drilling mud to such an extent that it cannot be circulated.

5. A water base well drilling mud comprising an aqueous fluid mixture containing suspended inorganic solids which form a filter cake on the wall of the well and a water soluble ethyl sulfoethyl cellulose selected from the group consisting of ethyl sulfoethyl cellulose and the water soluble inorganic salts thereof in an amount sufficient to reduce the water loss due to filtration through said filter cake without increasing the viscosity of said well drilling fluid to such an extent that it cannot be circulated.

6. A water base well drilling mud comprising an aqueous fluid mixture containing suspended inorganic solids which form a filter cake on the wall of the well and a water soluble ethyl sodium sulfoethyl cellulose in an amount sufficient to reduce the water loss due to filtration through said filter cake without increasing the viscosity of said well drilling mud to such an extent that it cannot be circulated.

7. A water base well drilling mud comprising an aqueous fluid mixture containing suspended inorganic solids which form a filter cake on the wall of the well and a water soluble ethyl ammonium sulfoethyl cellulose in an amount sufficient to reduce the water loss due to filtration through said filter cake without increasing the viscosity of said well drilling mud to such an extent that it cannot be circulated.

8. A water base well drilling mud comprising an aqueous fluid mixture containing suspended inorganic solids which form a filter cake on the wall of the well and a water soluble ethyl magnesium sulfoethyl cellulose in an amount sufficient to reduce the water loss due to filtration through said filter cake without increasing the viscosity of said well drilling mud to such an extent that it cannot be circulated.

9. A water base well drilling mud comprising, in combination, sufficient water to maintain the mud as a fluid, sufficient clayey material to form a filter cake on the wall of the well, and a water soluble ethyl sulfoethyl cellulose compound selected from the group consisting of ethyl sulfoethyl cellulose, ethyl alkali metal sulfoethyl cellulose, ethyl alkaline earth metal sulfoethyl cellulose, and ethyl ammonium sulfoethyl cellulose in an amount sufficient to reduce the water loss due to filtration through said filter cake without increasing the viscosity of said well drilling mud to such an extent that it cannot be circulated.

10. A water base well drilling mud comprising, in combination, sufficient water to maintain the mud as a fluid, sufficient clayey material to form a filter cake on the wall of the well, and a water soluble ethyl alkali metal sulfoethyl cellulose in an amount sufficient to reduce the water loss due to filtration through said filter cake without increasing the viscosity of said well drilling mud to such an extent that it cannot be circulated.

11. A water base well drilling mud comprising, in combination, sufficient water to maintain the mud as a fluid, sufficient clayey material to form a filter cake on the wall of the well, and a water soluble ethyl alkaline earth metal sulfoethyl cellulose in an amount sufficient to reduce the water loss due to filtration through said filter cake without increasing the viscosity of said well drilling mud to such an extent that it cannot be circulated.

12. A water base well drilling mud comprising, in combination, sufficient water to maintain the mud as a fluid, sufficient clayey material to form a filter cake on the wall of the well, and a water soluble ethyl potassium sulfoethyl cellulose in an amount sufficient to reduce the water loss due to filtration through said filter cake without increasing the viscosity of said well drilling mud to such an extent that it cannot be circulated.

13. A water base well drilling mud comprising, in combination, sufficient water to maintain the mud as a fluid, sufficient clayey material to form a filter cake on the wall of the well, and a water soluble ethyl lithium sulfoethyl cellulose in an amount sufficient to reduce the water loss due to filtration through said filter cake without increasing the viscosity of said well drilling mud to such an extent that it cannot be circulated.

14. A process for forming a filter cake, having a low rate of filtration of fluid therethrough, on the wall of a well by the deposition of colloidal clayey solids from a water base drilling mud circulated along said wall which comprises admixing with said drilling mud and interacting therewith a water soluble ethyl sulfoethyl cellulose selected from the group consisting of ethyl sulfoethyl cellulose and the water soluble inorganic salts thereof in an amount sufficient to decrease the rate of filtration of fluid through said filter cake but insufficient to increase the viscosity of said drilling mud to such an extent as to render it uncirculatable and then forming said filter cake from the resulting drilling mud.

15. A process for forming a filter cake, having a low rate of filtration of fluid therethrough, on the wall of a well by the deposition of colloidal clayey solids from a water base drilling mud circulated along said wall which comprises admixing with said drilling mud and interacting therewith a water soluble ethyl alkali metal sulfoethyl cellulose in an amount sufficient to decrease the rate of filtration of fluid through said filter cake but insufficient to increase the viscosity of said drilling mud to such an extent as to render it uncirculatable and then forming said filter cake from the resulting drilling mud.

16. A process for forming a filter cake, having a low rate of filtration of fluid therethrough, on the wall of a well by the deposition of colloidal clayey solids from a water base drilling mud circulated along said wall which comprises admixing with said drilling mud and interacting therewith a water soluble ethyl alkaline earth metal sulfoethyl cellulose in an amount sufficient to decrease the rate of filtration of fluid through said filter cake but insufficient to increase the viscosity of said drilling mud to such an extent as to render it uncirculatable and then forming said filter cake from the resulting drilling mud.

17. A process for forming a filter cake, having a low rate of filtration of fluid therethrough, on the wall of a well by the deposition of colloidal clayey solids from a water base drilling mud circulated along said wall which comprises admixing with said drilling mud and interacting therewith a water souble ethyl sodium sulfoethyl cellulose in an amount sufficient to decrease the rate of filtration of fluid through said filter cake but insufficient to increase the viscosity of said drilling mud to such an extent as to render it uncirculatable and then forming said filter cake from the resulting drilling mud.

18. A process for forming a filter cake, having a low rate of filtration of fluid therethrough, on the wall of a well by the deposition of colloidal clayey solids from a water base drilling mud circulated along said wall which comprises admixing with said drilling mud and interacting therewith a water soluble ethyl ammonium sulfoethyl cellulose in an amount sufficient to decrease the rate of filtration of fluid through said filter cake but insufficient to increase the viscosity of said drilling mud to such an extent as to render it uncirculatable and then forming said filter cake from the resulting drilling mud.

19. A process for forming a filter cake, having a low rate of filtration of fluid therethrough, on the wall of a well by the deposition of colloidal clayey solids from a water base drilling mud circulated along said wall which comprises admixing with said drilling mud and interacting therewith a water soluble ethyl magnesium sulfoethyl cellulose in an amount sufficient to decrease the rate of filtration of fluid through said filter cake but insufficient to increase the viscosity of said drilling mud to such an extent as to render it uncirculatable and then forming said filter cake from the resulting drilling mud.

20. The drilling mud composition of claim 5 wherein said ethyl sulfoethyl cellulose compound is a water soluble ethyl alkali metal sulfoethyl cellulose.

21. The drilling mud composition of claim 5 wherein said ethyl sulfoethyl cellulose compound is a water soluble ethyl alkaline earth metal sulfoethyl cellulose.

22. The drilling mud composition of claim 5 wherein said ethyl sulfoethyl cellulose compound is a water soluble ethyl potassium sulfoethyl cellulose.

23. The drilling mud composition of claim 5 wherein said ethyl sulfoethyl cellulose compound is a water soluble ethyl lithium sulfoethyl cellulose.

24. A process for forming a filter cake, having a low rate of filtration of fluid therethrough, on the wall of a well by the deposition of inorganic solids from a water base drilling mud circulated along said wall which comprises admixing with said drilling mud and interacting therewith a water soluble ethyl sulfoethyl cellulose selected from the group consisting of ethyl sulfoethyl cellulose and the water soluble inorganic salts thereof in an amount sufficient to decrease the rate of filtration of fluid through said filter cake but insufficient to increase the viscosity of said drill-